United States Patent
Johnston

(10) Patent No.: US 9,282,149 B2
(45) Date of Patent: Mar. 8, 2016

(54) READING GROUP EBOOK SYNCHRONIZATION

(71) Applicant: Google Inc., Mountain View, CA (US)

(72) Inventor: Nicholas Johnston, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/198,971

(22) Filed: Mar. 6, 2014

(65) Prior Publication Data

US 2015/0256618 A1 Sep. 10, 2015

(51) Int. Cl.
*H04L 29/08* (2006.01)
*H04L 29/06* (2006.01)

(52) U.S. Cl.
CPC ........ *H04L 67/1095* (2013.01); *H04L 63/0869* (2013.01); *H04L 63/104* (2013.01)

(58) Field of Classification Search
CPC ............ H04L 67/1095; H04L 63/0869; H04L 63/104; G06Q 10/109
See application file for complete search history.

(56) References Cited

U.S. PATENT DOCUMENTS

| | | | | |
|---|---|---|---|---|
| 8,793,575 B1 * | 7/2014 | Lattyak et al. | ................ | 715/273 |
| 2003/0009459 A1 * | 1/2003 | Chastain et al. | ................... | 707/7 |
| 2004/0107256 A1 * | 6/2004 | Odenwald et al. | ............ | 709/205 |
| 2007/0201702 A1 * | 8/2007 | Hendricks | ............... | G06F 21/10 380/282 |
| 2008/0163039 A1 * | 7/2008 | Ryan et al. | .................... | 715/206 |
| 2009/0228798 A1 * | 9/2009 | Kephart | ............ | G06F 17/30056 715/727 |
| 2010/0017371 A1 * | 1/2010 | Whalin et al. | .................... | 707/3 |
| 2010/0146115 A1 * | 6/2010 | Bezos | ............................ | 709/225 |
| 2010/0262659 A1 * | 10/2010 | Christiansen | ......... | G06F 17/241 709/205 |
| 2010/0306122 A1 * | 12/2010 | Shaffer | ......................... | 705/319 |
| 2011/0191692 A1 | 8/2011 | Walsh et al. | | |
| 2011/0298594 A1 | 12/2011 | Mish et al. | | |
| 2012/0197998 A1 * | 8/2012 | Kessel et al. | .................. | 709/205 |
| 2013/0015954 A1 | 1/2013 | Thorne et al. | | |
| 2014/0019835 A1 | 1/2014 | Kakiuchi | | |
| 2014/0040715 A1 * | 2/2014 | Younge | .................... | G06F 17/24 715/203 |
| 2014/0282095 A1 * | 9/2014 | Walters et al. | ................ | 715/753 |
| 2014/0315163 A1 * | 10/2014 | Ingrassia et al. | .............. | 434/169 |

FOREIGN PATENT DOCUMENTS

KR 10-2012-0036634 4/2012

OTHER PUBLICATIONS

TeamViewer, "Solution for online meetings, presentation, teamwork and TeamViewer features," 2014, 1 Page, [online] [retrieved from on Nov. 12, 2014] Retrieved from the internet <URL:http://www.teamviewer.com/en/products/online-meeting.aspx>.

(Continued)

*Primary Examiner* — Joseph P Hirl
*Assistant Examiner* — Stephen Gundry
(74) *Attorney, Agent, or Firm* — Fenwick & West LLP

(57) ABSTRACT

A reading group that is associated with an ebook is defined, the reading group including a master device and one or more follower devices. A synchronization command is received from the master device to synchronize the reading location of the one or more follower devices to a read section, the read section specifying a portion of the ebook. The synchronization command is provided to the one or more follower devices, and in response to receiving the synchronization command the one or more follower devices are configured to present the ebook in accordance with the read section.

18 Claims, 5 Drawing Sheets

(56) References Cited

OTHER PUBLICATIONS

Displaynote Technologies, Webpage for DisplayNote, 2014, 7 Pages, [online] [retrieved from on Nov. 12, 2014] Retrieved from the internet <URL:http://displaynote.com/>.

Cisco, Webpage for WebEx, 2014, 4 Pages, [online] [retrieved from on Nov. 12, 2014] Retrieved from the internet <URL:http://www.webex.com/>.

PCT International Search Report and Written Opinion for PCT/US2015/012065, Apr. 30, 2015, 11 Pages.

* cited by examiner

READING GROUP EBOOK SYNCHRONIZATION

BACKGROUND

1. Field of Disclosure

This disclosure relates to the field of electronic books (ebooks), and specifically to synchronization of e-books within members of a reading group.

2. Description of the Related Art

Many users utilize their digital devices to read material such as novels, news articles, short stories, etc., view videos, view pictures, or more generally interact with some sort of displayed content. Sometimes it is desirable to read ebooks in a group setting (e.g., students reading a portion of a text together during class). However, ebooks may be displayed via different types of digital devices, and some of the digital devices have different display areas that affect pagination or other display characteristics. Accordingly, it can often be difficult for a reader of an ebook to follow along with other readers.

SUMMARY

The above and other needs are met by a computer-implemented method, a non-transitory computer-readable storage medium storing executable code, and a device for synchronizing a reading location of computing devices in a reading group.

One embodiment of the computer-implemented method for synchronizing a reading location of computing devices in a reading group, comprises defining a reading group that is associated with an ebook, the reading group including a master device and one or more follower devices. A synchronization command is received from the master device to synchronize the reading location of the one or more follower devices to a read section, the read section specifying a portion of the ebook. The synchronization command is provided to the one or more follower devices, and in response to receiving the synchronization command the one or more follower devices are configured to present the ebook in accordance with the read section.

One embodiment of a non-transitory computer-readable storage medium storing executable computer program instructions for synchronizing a reading location of computing devices in a reading group, comprises defining a reading group that is associated with an ebook, the reading group including a master device and one or more follower devices. A synchronization command is received from the master device to synchronize the reading location of the one or more follower devices to a read section, the read section specifying a portion of the ebook. The synchronization command is provided to the one or more follower devices, and in response to receiving the synchronization command the one or more follower devices are configured to present the ebook in accordance with the read section.

One embodiment of a device for synchronizing to a reading location of a computing device in a reading group, comprises a processor configured to execute modules, and a memory storing the modules. The modules include a configuration module configured to cause the device to act as a follower device in a reading group that is associated with an ebook, the reading group including a master device. The modules also include a synchronization module configured to: responsive to receipt of a synchronization command including a read section that specifies a portion of the ebook, extract location information from the read section, identify a portion of the ebook that corresponds to the extracted location information, and divide the portion of the ebook into one or more subsets based in part on the display area of the follower device. The modules also include a user interface module configured to present a first subset of the one or more subsets to the user of the follower device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
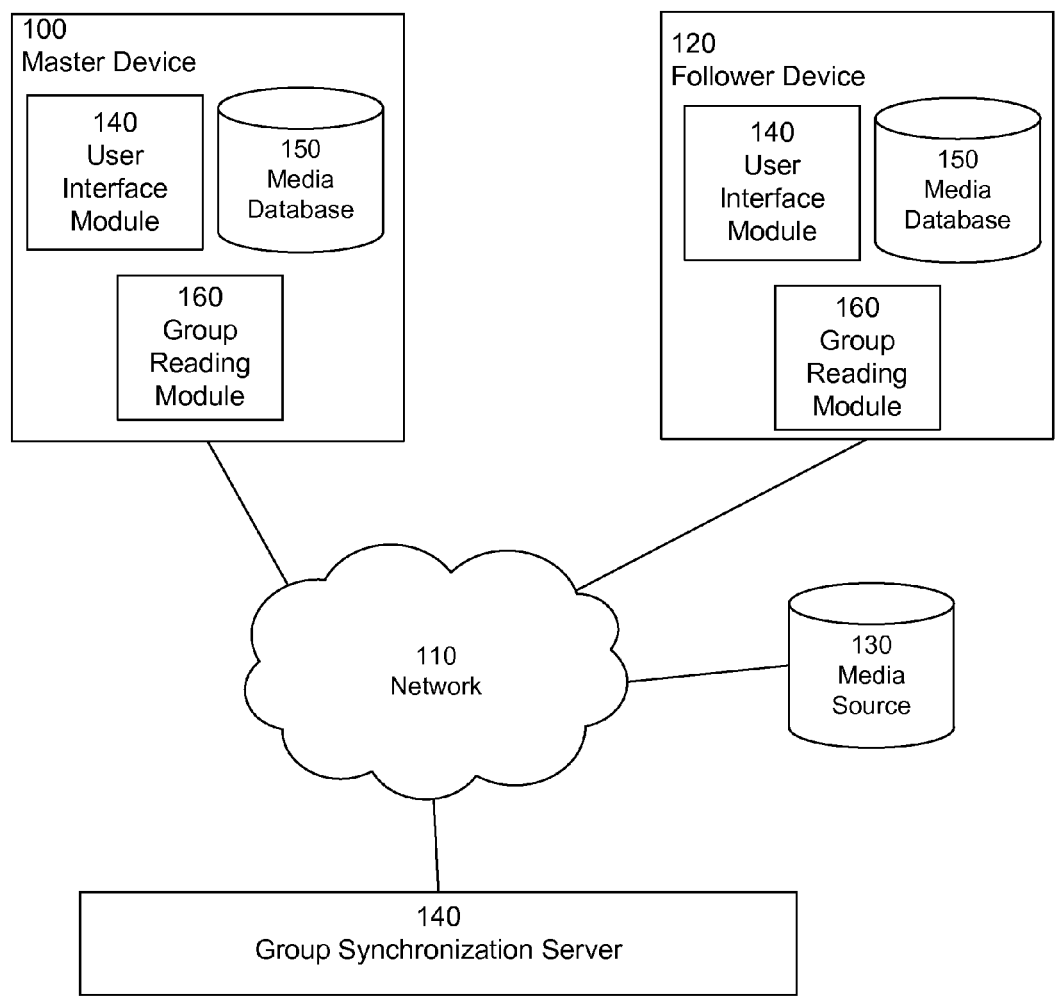
FIG. 1 is a high-level block diagram illustrating an embodiment of an environment for synchronizing e-readers in a reading group.

FIG. 1 is a high-level block diagram illustrating an embodiment of an environment for synchronizing e-readers in a reading group. The environment includes a master device 100 connected by a network 110 to a follower device 120, a media source 130, and a group synchronization server 140. Here only one master device 100, follower device 120, media source 130, and group synchronization server 140 are illustrated, but there may be multiple instances of each of these entities. For example, there may be thousands or millions of master devices 100 and follower devices 120 in communication with multiple group synchronization servers 140 and media sources 130.

The network 110 provides a communication infrastructure between the master device 100, the follower device 120, the media source 130, and the group synchronization server 140. The network 110 is typically the Internet, but may be any network, including but not limited to a Local Area Network (LAN), a Metropolitan Area Network (MAN), a Wide Area Network (WAN), a mobile wired or wireless network, a private network, a virtual private network, or some combination thereof.

The media source 130 includes one or more computer servers that provide ebooks to the master devices 100 and follower devices 120. The media source 130 may be, for example, an ebook retailer, a library, etc. An ebook may be identified using a media identifier. The media source 130 may directly provide ebooks to the master devices 100 and follower devices 120 via the network 110, or the devices (i.e., 100 or 120) may receive the ebooks from other sources.

The master device 100 is a computing device that executes computer program Modules—e.g., a web browser or other client application—which allow a user to view ebooks, newsfeeds, browse the internet, and generally consume media content. The master device 100 might be, for example, a personal computer, a tablet computer, a smart phone, a laptop computer, GOOGLE GLASS®, a dedicated e-reader, or other type of network-capable device that is able to display ebooks.

The master device 100 controls synchronization of one or more follower devices 120 in a reading group. For example, the master device 100 may control what portions of an ebook are available for presentation to users of follower devices 120 in the reading group. The master device 100 is a computing device that is designated to act as the master in a reading group. A reading group includes a master device 100 and one or more follower devices 120. Likewise, in some embodiments, the same computing device may instead be designated to act as a follower device 120. How a computing device is designated to act as a master device 100 or a follower device 120 is discussed in detail below with respect to FIG. 3.

The master device 100 comprises a user interface module 140, a media database 150, and a group reading module 160 in one embodiment. In one embodiment these entities are software application modules executing on the master device. For example, the modules 140, 150, and 160 may be integrated into an application executing on an e-reader.

The user interface module 140 enables a user operating the master device 100 to request content from the media database 150 and/or the media source 130. The user interface module 140 also presents the requested content to the user of the master device 100. For example, the user operating the user device 100 may select an ebook to read from a list of ebook choices displayed via the user interface module 140, and the user interface module 140 then sends a request for the selected ebook to the media source 130. The user interface module 140 displays portions of the requested ebook to the user.

The media database 150 stores content and information relating to ebooks. Information relating to ebooks includes, for example, a media identifier, ebook text, location information, metadata associated with the content, or some combination thereof. The metadata describes different aspects of the content. Location information identifies locations of content within an ebook. The metadata may comprise, for example, author, date of publishing, reviews, genre information, publisher, ratings, a media item identifier etc.

The group reading module 160 generates a group request to create a reading group. A group request requests creation of a reading group. In some embodiments, the group request may include an identifier associated with an ebook, portions of which are to be read by the reading group. The group reading module 160 sends the group request to the group synchronization server 140. The group reading module 160 also receives a group confirmation from the group synchronization server 140. The group confirmation confirms that a reading group has been created. The group confirmation may include, for example, a group identifier, a device designation, or both. A group identifier is a unique identifier for the created reading group. A device designation instructs the computing device to act as a master device 100 or a follower device 120. In this example, the computing device that sent the group request is designated the master device 100.

The group reading module 160 controls reading group membership. The group reading module 160 allows the user of the master device 100 to specify privacy settings that control whether a follower device 120 is allowed to join the reading group. The group reading module 160 provides the privacy settings to the group synchronization server 140. In some embodiments, the group reading module 160 receives a notification from the group synchronization server 140 when a follower device 120 has joined the reading group. In some embodiments, the group reading module 160 may edit membership of the reading group. For example, the group reading module 160 may add or remove a follower device 120 from the reading group. In some embodiments, the group reading module 120 may request a follower device 120 join the reading group either directly (e.g., via a Bluetooth® connection between the devices) or via the group synchronization server 140.

The group reading module 160 enables a master device 100 to control what portions of the ebook are available for presentation to the users of the follower devices 120 in the reading group. The group reading module 160 synchronizes a reading location of follower devices 120 in the reading group with a reading section designated by the master device 120. A read section is location information describing a portion of the ebook associated with the reading group. A read section may be, for example, a page being displayed by the master device 100, a chapter, a paragraph, some range of ebook content, or some combination thereof.

The group reading module 160 generates a synchronization command for distribution to follower devices 120 in the reading group. A synchronization command causes a follower device 120 in the reading group to automatically display a portion of the ebook in accordance with a read section. The synchronization command causes the follower device 120 to display the portion of the ebook that corresponds to the beginning of the read section, and allows the follower device 120 to present ebook content that corresponds to the portion of the ebook described by the read section. In some embodiments, the synchronization command prevents the follower device 120 from presenting portions of the ebook outside of the portion described by the read section. A synchronization command may additionally include, for example, a group identifier, a follower device identifier, or some combination thereof. The group reading module 160 sends the synchronization command to the group synchronization server 140 for distribution to the follower devices 120 in the reading group.

The group reading module 160 receives feedback messages from follower devices 120 in the reading group. A feedback message indicates that a user of a follower device 120 in the reading group has completed reading a portion of the ebook that corresponds to a read section. For example, the group reading module 160 may present one or more graphic indicators to the user of the master device 100 for a received feedback message. A feedback message may be received directly from a follower device 120 or via the group synchronization server 140.

The follower device 120 is a computing device like the master device 100, but has been designated as a follower device 120. The follower device 120 may include the same user interface 140, media database 150, and group reading module 160 found in the master device 100. However, the group reading module 160 may perform different functions when the computing device is acting as a follower device 120. For example, the group reading module 160 in a follower device 120 is able to send feedback messages indicating completion of the read section to the master device 100.

When a computing device is acting as a follower device 120, the group reading module 160 enables a user operating the follower device 120 to request to join a reading group. The group reading module 160 retrieves a list of candidate reading groups from the group synchronization server 140 or the master device 100. The group reading module 160 generates a join request based on the user's selection of a candidate reading group. A join request is a request for a follower device 120 to join a particular reading group. A join request may include, for example, a device identifier, a group identifier, and authentication information (e.g., password). The group reading module 160 then sends the join request to the group synchronization server 140. The group reading module 160 receives a join confirmation that indicates whether the follower device 120 has been successfully added to the reading group.

In a follower device 120 the group reading module 160 synchronizes the portion of the ebook available for display with a read section received in a synchronization command. The group reading module 160 determines a read section from a synchronization command received from the group synchronization server 140 or the master device 100. The group reading module 160 then instructs the user interface module 140 to present portions of the ebook in accordance with the read section. For example, the synchronization command may cause the user interface module 140 to present a particular page in the ebook. Additionally, in some embodiments, the group reading module 160 can prevent the user interface module 140 from presenting ebook content that is outside of the location information specified in the read section.

In a follower device 120 the group reading module 160 is able to send a feedback message to the master device 100. The group reading module 160 presents a user of the follower device 100 with an option to send feedback to the master device 100 that indicates the user had completed reading the portion of the ebook associated with the read section. For example, after a user may select a soft button that causes the group reading module 160 to generate and send a feedback message to the group synchronization server 140 and/or the master device 100.

The group synchronization server 140 creates reading groups based on received group requests. The group synchronization server 140 generates a group identifier based on a received group request. The group synchronization server 140 designates a computing device a master device 100. For example, the group synchronization server 140 may designate the requesting device as the master device 100, or some other computing device (e.g., computing device specified in the group request). The group synchronization server 140 generates a group confirmation confirming the creation of the reading group. The group synchronization server 140 then sends the group confirmation to the computing device that sent the group request. In some embodiments, the group synchronization server 140 may send the group confirmation to computing devices other than the one which sent the group request.

The group synchronization server 140 also controls membership of reading groups. The group synchronization server 140 receives join requests from various computing devices. The group synchronization server 140 joins the computing devices to requested reading groups in accordance with privacy settings of the requested group. The group synchronization server 140 sends a join confirmation to a computing device that has been added to a reading group including its device designation (e.g., follower device 120).

The group synchronization server 140 distributes synchronization commands to follower devices 120 in a reading group. Additionally, the group synchronization server 140 receives feedback messages from follower devices 120, identifies the master device 100 that corresponds to each of the follower devices 120, and provides the feedback message to the identified master devices 100. In alternate embodiments, the master device 100 may perform some or all of the functions of the group synchronization server 140.

Accordingly, a user of a master device 100 is able synchronize content being presented across all members of a reading group. The master device 100 is able to control what portion of an ebook is available for presentation by each of the follower devices 120 in the reading group. The system disclosed herein accommodates the different reading speeds of users by providing them a feedback option that is used to notify the user of the master device 100 that they have completed reading the portion of the ebook associated with the read section. Additionally, each user of a follower device 120 has control over what portion of the ebook is being displayed within the portion of the ebook described by the read section. For example, if a read section is chapter 10 of an ebook. Each user of the follower device is able to independently read, at their own reading speed, chapter 10.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
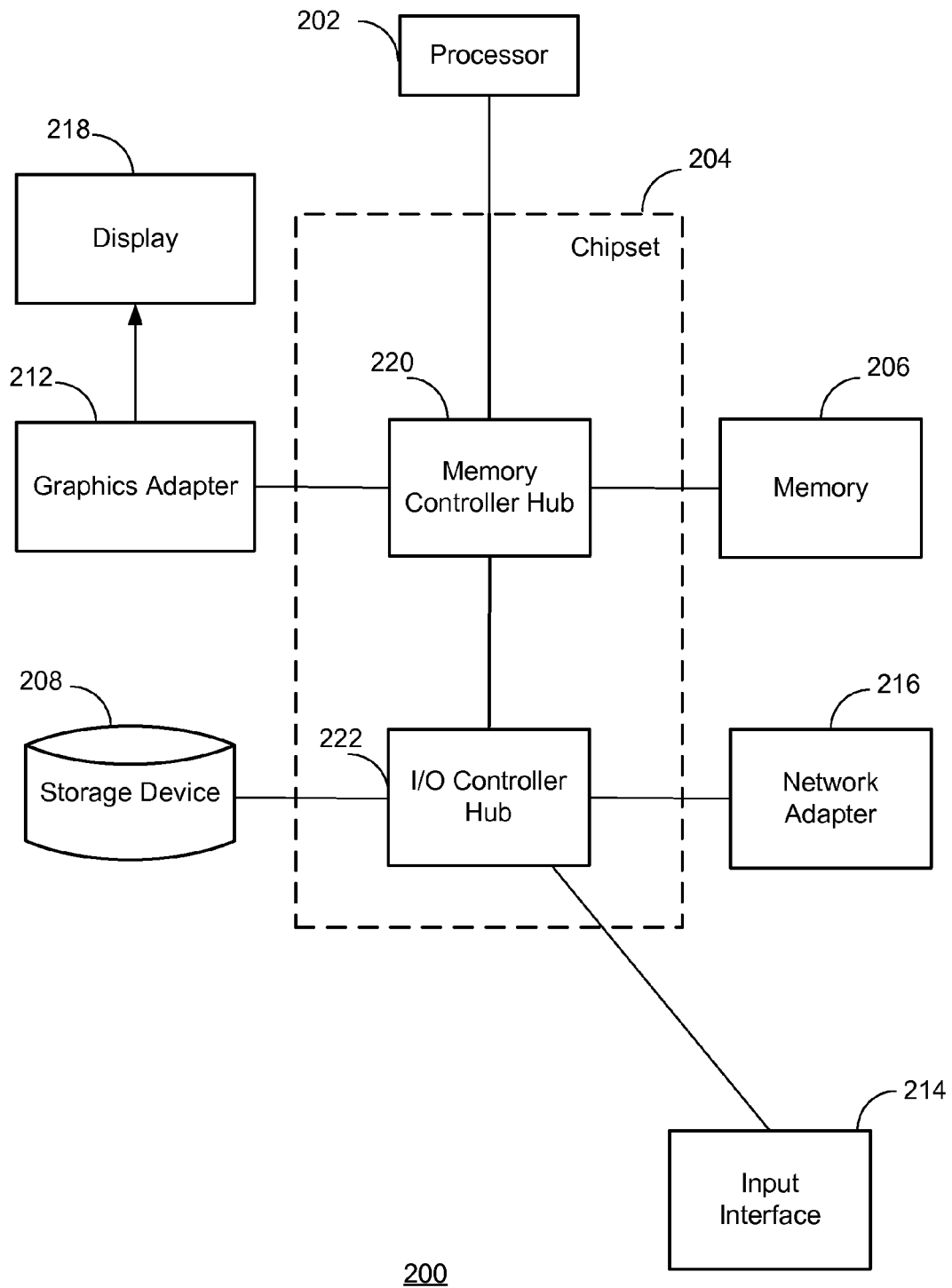
FIG. 2 is a high-level block diagram illustrating an example computer for implementing the entities shown in FIG. 1.

Turning now to a discussion of the implementation of the entities discussed above, FIG. 2 is a high-level block diagram illustrating an example computer 200 for implementing one or more of the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, a microphone, or some combination thereof, and is used to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computer 200 used by the entities of FIG. 1 can vary depending upon the embodiment and the processing power required by the entity. For example, the group synchronization server 140 may include multiple computers 200 communicating with each other through a network such as in a server farm to provide the functionality described herein. Such computers 200 may lack some of the components described above, such as graphics adapters 212 and displays 218.

Figure 3:
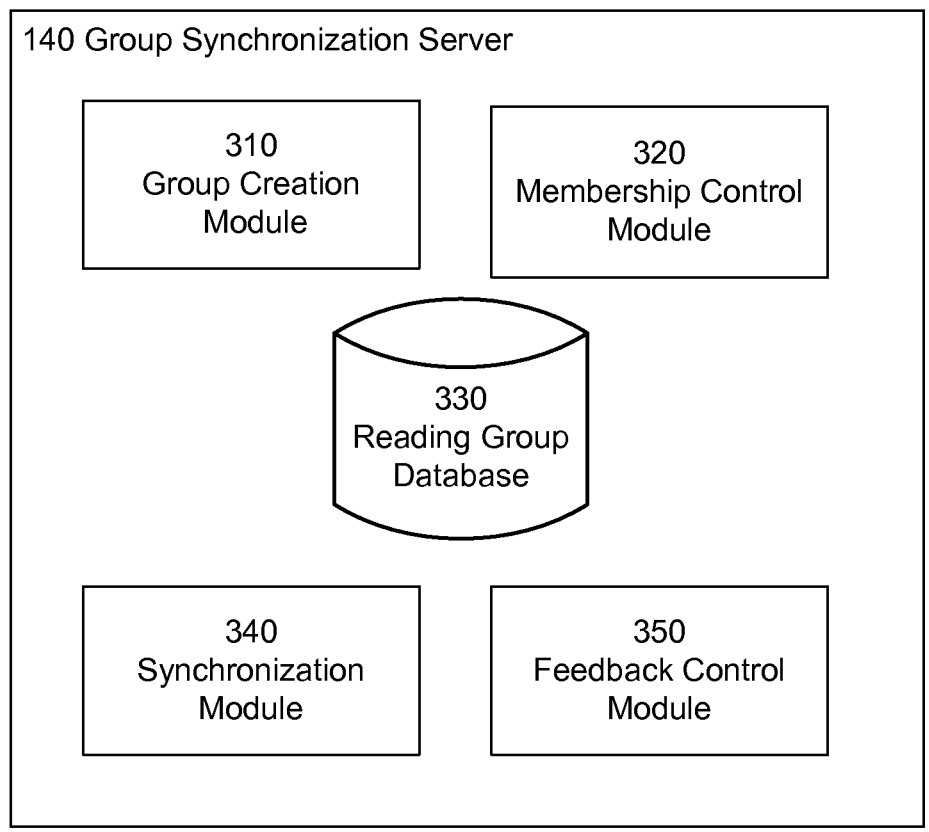
FIG. 3 is a high-level block diagram illustrating a detailed view of modules within a group synchronization server according to one embodiment.

FIG. 3 is a high-level block diagram illustrating a detailed view of modules within the group synchronization server 140 according to one embodiment. The group synchronization server 140 is comprised of modules including a group creation module 310, a membership control module 320, a reading group database 330, a synchronization module 340, and a feedback control module 350. Some embodiments of the group synchronization server 140 have different modules than those described here. Similarly, the functions can be distributed among the modules in a different manner than is described here.

The group creation module 310 creates reading groups based on received group requests. To create a reading group, the group creation module 310 creates a group identifier and designates a master device 100 for the reading group. The group identifier may be generated in a number of ways. For example, the group identifier may be randomly generated based on receipt of a group request. Alternatively, the group identifier may be generated using information included in the group request. For example, the group creation module 310 may generate the group identifier using a hash of: a device ID (e.g., of the requesting device); the media identifier; or a combination thereof. The group creation module 310 designates a master device 100 for the reading group by, for example, selecting the computing device that requested creation of the reading group as the master device, selecting the master device 100 in accordance with a device ID in the group request, or selecting a master device 100 in accordance with pre-determined selection information. Pre-determined selection information is information that identifies a particular computing device as a master device 100 or a follower device 120.

The group creation module 310 also generates a group confirmation that confirms creation of the reading group. In some embodiments, the group confirmation includes the group identifier associated with the reading group. Additionally, in some embodiments, the group confirmation includes a device designation that informs the s computing device whether it is designated a master device 100 or a follower device 120. The group creation module sends the group confirmation to the requesting computing device. In some embodiments, the computing device that sent the group request is not designated the master device 100. Accordingly, the group creation module 310 sends a group confirmation to both the computing device that sent the group request and a computing device designated as the master device 100. The group creation module 310 stores the group identifier, identification information for the master device 100, identification information for a follower device 120, or some combination thereof, in the reading group database 330.

The membership control module 320 controls membership of reading groups. In some embodiments the membership control module 320 adds a computing device as a follower device 120 to a reading group based on receipt of a join request. The membership control module 320 extracts a group identifier from the join request. The membership control module 320 then adds the requesting computing device as a follower device 120 to the reading group identified by the group identifier.

In some embodiments, the membership control module 320 adds a follower device 120 to a reading group in accordance with privacy settings received from the master device 100, authorization information received from the follower device 120, or some combination thereof. Privacy settings describe one or more conditions for joining a reading group. Privacy settings may include, for example, a login and/or password, number of members, information identifying a list of approved follower devices 120, some condition that has to be met in order to join the reading group, or some combination thereof. In some embodiments, the privacy settings may indicate that any computing device may join a reading group as a follower device 120.

The membership control module 320 may send a join confirmation to the follower device 120 informing the follower device 120 whether it has been successfully added to the requested reading group. Additionally, the membership control module 320 updates the reading group database 330 with information identifying the follower device 120 as being a member of the reading group.

The reading group database 330 stores reading group information associated with reading groups. Each reading group has associated reading group information that describes the reading group. Reading group information for a reading group may include, for example, a group identifier, a media identifier, identification information for the master device 100, identification information for each follower device 120 in the reading group, or some combination thereof.

The synchronization module 340 distributes synchronization commands to follower devices 120 in a reading group. The synchronization command controls how a portion of the ebook is presented by a follower device 120. For example, the synchronization command may cause the follower device 120 to automatically present a portion of the ebook. The synchronization module 340 retrieves a group identifier from a synchronization command received from a master device 100. The group synchronization server 140 identifies follower devices 120 associated with the group identifier using reading group information in the reading group database 330. The synchronization module 340 distributes the synchronization command to the identified follower devices 120 in the reading group. In some embodiments, the synchronization module 340 distributes synchronization commands to follower devices 120 in accordance with follower devices 120 identified in the synchronization command.

The feedback control module 350 provides feedback messages to the master device 100 for a reading group. As discussed in detail below with respect to FIG. 4, the feedback messages may be used by the master device 100 to notify an associated user that one or more users of the follower devices 120 have completed the read section. The feedback control module 350 may receive feedback messages from follower devices 120 associated with different reading groups. The feedback control module 350 extracts a group identifier from a feedback message, and uses the group identifier to identify the master device 100 for the reading group. In some embodiments, the feedback control module 350 provides the feedback message to the master device 100. Alternatively, the feedback control module 350 may aggregate the feedback messages into a single feedback message which is provided to the master device 100.

Figure 4:
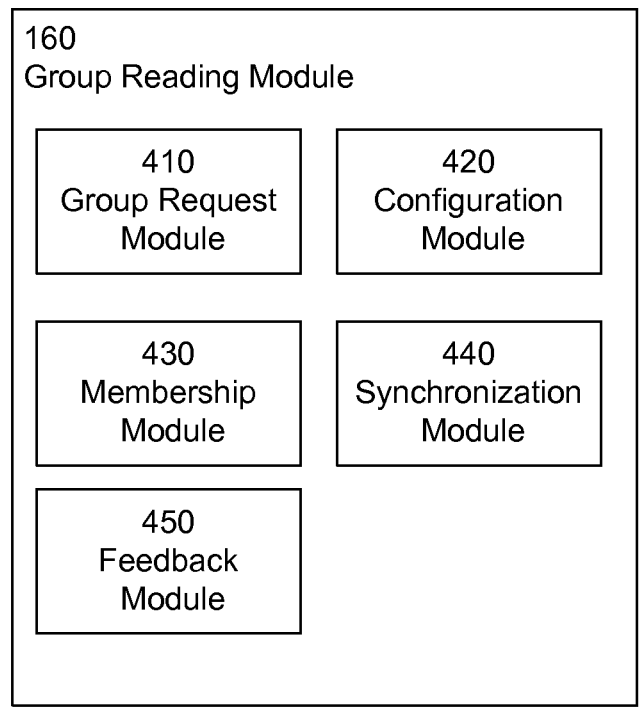
FIG. 4 is a high-level block diagram illustrating a detailed view of modules within a group reading module of a computing device according to one embodiment.

FIG. 4 is a high-level block diagram illustrating a detailed view of modules within the group reading module 160 of a computing device according to one embodiment. The group reading module 160 is comprised of modules including a group request module 410, a configuration module 420, a membership module 430, a synchronization module 440, and a feedback module 450. Some embodiments of the group reading module 160 have different modules than those described here. Similarly, the functions can be distributed among the modules in a different manner than is described here.

The group request module 410 generates a group request to create a reading group. The group request module 410 creates the group request using information identifying the computing device, and a media identifier associated with an ebook. In some embodiments, the group request module 410 generates a group identifier using the information in the group request. In other embodiments, the group request module 410 sends the group request to the group synchronization server 140.

The group request module 410 also receives a group confirmation from the group synchronization server 140. The group request module 410 extracts a group identifier from the group confirmation. Additionally, in some embodiments, the group request module 410 extracts a device designation from the group confirmation. The group request module 410 passes the device designation to the configuration module 420.

The configuration module 420 configures the computing device to act as a master device 100 or a follower device 120. In some embodiments, the configuration module 420 configures the computing device as a master device 100 or follower device 120 based on a received device designation (e.g., from the group synchronization server 140). In alternate embodiments, the configuration module 420 may designate the computing device a master device if the computing device generated a group identifier. The configuration module 420 then instructs one or more of the other modules to act in accordance with the configuration (i.e., a master device 100 or a follower device 120).

The membership module 430 controls membership of the computing device within one or more reading groups. In embodiments where the computing device is a follower device 120, the group reading module 120 may generate a join request. The membership module 430 may generate the list of one or more candidate reading groups based on, for example, reading groups detected using the network 110, information received from the group synchronization server 140, or both. The membership module 430 may present to the user of the computing device a list of one or more candidate reading groups. And a user operating the follower device 120 may select a reading group from a list of candidate reading groups.

The membership module 430 generates a join request based on the user's selection of a candidate reading group. In some embodiments, the join request may include authentication data (e.g., a password). The membership module 430 may send the join request to the group synchronization server 140 and/or a master device 100 requesting to join a particular reading group. In some embodiments, the membership module 430 receives a join confirmation from the group synchronization server 140 or the master device 100 that confirms their addition to the reading group. In embodiments where the computing device is configured to act as a master device 100, the membership module 430 enables a user of the master device 100 to selectively edit membership of a reading group associated with the master device 100. For example, the master device 100 may present to the user a user interface that allows the user remove a follower device 120 from the reading group, add a follower device 120 to the reading group, or both.

The synchronization module 440 synchronizes a reading location among computing devices in a reading group. The synchronization module 440 retrieves an ebook from media source 130 or media database 150 using a media identifier. The synchronization module 440 synchronizes portions of the ebook available for display among computing devices in the reading group.

If the computing device is acting as a master device 100, the synchronization module 440 receives a read section from a user. In some embodiments, the synchronization module 440 automatically designates the page of the ebook being presented to the user of the master device 100 as the read section. Additionally, as the user of the master device 100 turns the pages in the ebook, the synchronization module 440 automatically generates new read sections corresponding to the new pages. In other embodiments, a user of the master device 100 may designate a particular portion of the ebook a read section. For example, the user of the master device 100 may designate a particular chapter the read section. The synchronization module 440 generates a synchronization command using the read section and the group identifier. In some embodiments, the synchronization command may be distributed to all follower devices 120 in the reading group. Alternatively, a user of the master device 100 may specify particular follower devices 120 (e.g., using a device identifier) to receive the synchronization command. In some embodiments, the synchronization module 440 sends the synchronization command to the group synchronization server 140 for distribution to the rest of the reading group. Alternatively, the synchronization module 440 may send the synchronization command directly (e.g., via a wireless network) to the rest of the reading group.

In some embodiments, the synchronization module 440 may receive a synchronization confirmation indicative that the follower devices 120 in the reading group are synchronized to the read section. A synchronization confirmation confirms whether synchronization was successful for a follower device 120. A synchronization confirmation may be, for example, a graphic indicator, a tone, etc. In some embodiments, the synchronization confirmation is on a per-device basis. Alternatively, the synchronization confirmation is for all the follower devices 120.

If the computing device is acting as a follower device 120, the synchronization module 440 synchronizes the portion of the ebook available for display with a read section received in a synchronization command. For example, the synchronization module 440 may automatically turn from a page being presented to a user to some other page in the ebook in accordance with the read section.

The synchronization module 440 causes the user interface module 140 to present a portion of the ebook to the user of the follower device 120 specified by a read section. The synchronization module 440 extracts location information from the read section. The synchronization module 440 identifies a portion of the ebook that corresponds to the extracted location information. The synchronization module 440 divides the portion of the ebook into one or more subsets based on the amount of ebook content that the follower device 120 is able to present at a given time to its user (e.g., a display space that is used to display ebook content to the user). The subsets are ordered to preserve the correct flow of content in the ebook. Additionally, each subset corresponds to at most one page of ebook content when displayed by the follower device 120.

The synchronization module 440 provides a first subset (of the one or more subsets) of the ebook to the user interface module 140 for presentation to the user of the follower device 120. In embodiments where a subset is the entire portion of the ebook, the follower device 120 is able to display to the user the entire portion of the ebook on a single page. Likewise, in embodiments where the portion of the ebook is divided into multiple subsets, the follower device 120 is able to display a single subset at a given time to the user, but allows the users to page and/or scroll through the remaining subsets. In some embodiments, the synchronization module 440 prevents the follower device 120 from presenting ebook content to the user that is outside of the portion of the ebook specified by the read section. Alternatively, in some embodiments, the synchronization module 440 allows the follower device 120 to present other portions of the ebook after a first subset of the ebook is presented to the user. For example, the synchronization command may cause the follower device 120 to present a particular page of the ebook to its user, after which the follower device 120 allows the user to freely scroll/page to other locations in the ebook.

The feedback module 450 processes feedback messages. If the computing device is acting as a follower device 120, the feedback module 450 presents a user of the follower device 100 with an option to send a feedback message to a master device 100. The feedback module 450 present a soft button or some other input option that when selected by the user causes the group reading module 160 to generate a feedback message. The feedback message provides information about the reading state of a user of the follower device 120. In some embodiments, the feedback message indicates that the user has completed reading the portion of the ebook associated with the read section. The feedback module 450 sends the feedback message to the group synchronization server 140 and/or the master device 100.

If the computing device is acting as a master device 100, the feedback module 450 presents one or more feedback messages to the user of the master device 100. The feedback messaged provides information about the reading states of users of the follower devices 120 in the reading group associated with the master device 120. For example, reading states may include, for example, completion of the read section, partial completion of a reading section, non-comprehension (e.g., user does not understand some of the content), etc.

The feedback message may simply be a graphic that indicates some or all of the follower devices 120 have completed the reading section. This is helpful to the user of the master device 100, as it lets them know when they may designate a new read section for the reading group.

In alternate embodiments, the group reading module 160 may additionally include and/or perform some or all of the functions of the group synchronization server 140 as described above with regard to FIG. 1 and FIG. 3. For example, a master device 100 may also act as the group synchronization server 140. Thus, allowing the master device 100 to interact directly with one or more follower devices 120 via the network 110.

Figure 5:
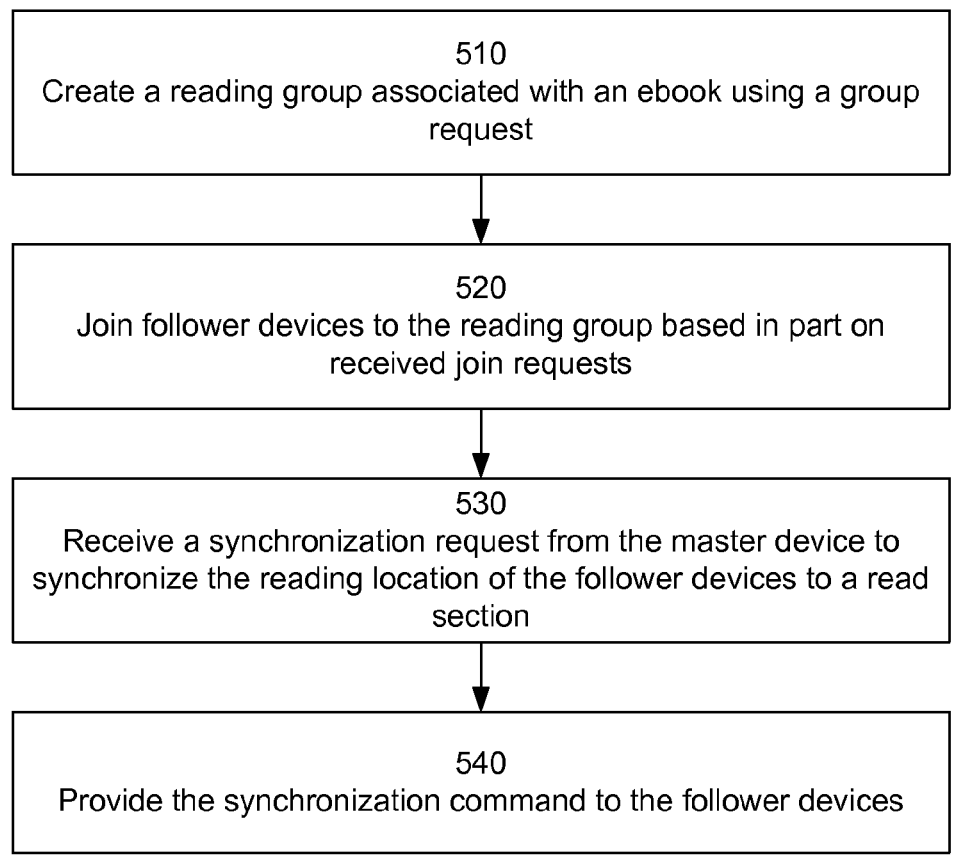
FIG. 5 is a flowchart illustrating a process of synchronizing computing devices in a reading group according to one embodiment.

FIG. 5 is a flowchart illustrating a process of synchronizing computing devices in a reading group according to one embodiment. In one embodiment, the process of FIG. 5 is performed by the group synchronization server 140. Other entities may perform some or all of the steps of the process in other embodiments Likewise, embodiments may include different and/or additional steps, or perform the steps in different orders.

The group synchronization server 140 creates 510 a reading group that is associated with an ebook using a group request. In some embodiments, the group synchronization server 140 generates a group identifier using information within the group request. Additionally, the group synchronization server 140 designates a computing device as a master device 100. For example, the group synchronization server 140 may designate the computing device that sent the group request as the master device 100.

The group synchronization server 140 joins 520 follower devices 120 to the reading group based in part on received join requests. For example, in responds to receiving a join request, the group synchronization server 140 may add the computing device to the requested reading group as a follower device 120. In some embodiments, whether a group synchronization module 140 adds a computing device to a reading group is based in part on privacy settings received from the master device 100, authentication information received from the computing device, or both. In some embodiments, steps 510 and 520 may be combined into a single step that defines the reading group that is associated with the ebook.

The group synchronization server 140 receives 530 a synchronization command from the master device 100 to synchronize the reading location of the follower devices to a read section. For example, the read section may be the page currently being presented to a user of the master device 100.

The group synchronization server 140 provides 540 the synchronization command to the follower devices 120. The group synchronization server 140 may identify the follower devices 120 using a group identifier in the synchronization command and a reading group database 330. The group synchronization server 140 then sends the synchronization command to the identified follower devices 120. Responsive to receipt of the synchronization command, the follower devices 120 extract location information from the read section in the synchronization command, identify a portion of the ebook using the location information, divide the portion of the ebook into one or more subsets, and present a subset of the portion of the ebook to their respective users.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automated dictionary generation. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for synchronizing a reading location of computing devices in a reading group, comprising:
    defining the reading group that is associated with an ebook, the reading group including a master device associated with a first user and one or more follower devices that are each associated with a respective user other than the first user;
    receiving a synchronization command from the master device to synchronize the reading location of the one or more follower devices to a read section, the read section specifying a portion of the ebook; and
    providing the synchronization command to the one or more follower devices, wherein responsive to receiving the synchronization command the one or more follower devices are configured to, for a given follower device:
        extract location information from the read section,
        identify the portion of the ebook that corresponds to the extracted location information,
        divide the portion of the ebook into one or more subsets based in part on a display area of the given follower device, each of the one or more subsets specific to the given follower device, and
        present a first subset, of the one or more subsets specific to the given follower device on the display area of the given follower device.

2. The computer-implemented method of claim 1, wherein defining a reading group that is associated with an ebook, the reading group including a master device associated with a first user and one or more follower devices that are each associated with a respective user other than the first user, further comprises:
    creating the reading group based on a group request received from the master device; and
    joining one or more computing devices to the reading group as the one or more follower devices, the joining based in part on join requests received from the one or more computing devices.

3. The computer-implemented method of claim 2, further comprising:
    generating a group identifier based on information within the group request;
    generating a group confirmation that confirms creation of the reading group, the group confirmation including the group identifier; and
    providing the group confirmation to the master device.

4. The computer-implemented method of claim 2, wherein joining one or more computing devices to the reading group as the one or more follower devices, the joining based in part on join requests received from the one or more computing devices, further comprises:
    extracting authentication information from the join requests;
    determining that the authentication information satisfies privacy settings, the privacy settings provided at least in part by the master device; and
    responsive to the authentication information satisfying the privacy settings, sending a group confirmation to the one or more follower devices.

5. The computer-implemented method of claim 1, further comprising:
    receiving a feedback message from a follower device in the reading group, the feedback message indicating a reading state of a user of the follower device; and
    providing the feedback message to the master device, wherein responsive to receipt of the feedback message the master device presents to an associated user, via a user interface, a notification indicative of the reading state of the user of the follower device.

6. The computer-implemented method of claim 1, wherein the follower device prevents the user from viewing ebook content that is not specified by the read section.

7. A non-transitory computer-readable storage medium storing executable computer program instructions for synchronizing a reading location of computing devices in a reading group, the instructions executable to perform steps comprising:
    defining the reading group that is associated with an ebook, the reading group including a master device associated with a first user and one or more follower devices that are each associated with a respective user other than the first user;
    receiving a synchronization command from the master device to synchronize the reading location of the one or more follower devices to a read section, the read section specifying a portion of the ebook; and
    providing the synchronization command to the one or more follower devices, wherein responsive to receiving the synchronization command the one or more follower devices are configured to, for a given follower device:
        extract location information from the read section,
        identify the portion of the ebook that corresponds to the extracted location information,
        divide the portion of the ebook into one or more subsets based in part on a display area of the given follower device, each of the one or more subsets specific to the given follower device, and
        present a first subset, of the one or more subsets specific to the given follower device on the display area of the given follower device.

8. The computer-readable medium of claim 7, wherein defining a reading group that is associated with an ebook, the reading group including a master device associated with a first user and one or more follower devices that are each associated with a respective user other than the first user, further comprises:
creating the reading group based on a group request received from the master device; and
joining one or more computing devices to the reading group as the one or more follower devices, the joining based in part on join requests received from the one or more computing devices.

9. The computer-readable medium of claim 8, further comprising:
generating a group identifier based on information within the group request;
generating a group confirmation that confirms creation of the reading group, the group confirmation including the group identifier; and
providing the group confirmation to the master device.

10. The computer-readable medium of claim 8, wherein joining one or more computing devices to the reading group as the one or more follower devices, the joining based in part on join requests received from the one or more computing devices, further comprises:
extracting authentication information from the join requests;
determining that the authentication information satisfies privacy settings, the privacy settings provided at least in part by the master device; and
responsive to the authentication information satisfying the privacy settings, sending a group confirmation to the one or more follower devices.

11. The computer-readable medium of claim 7, further comprising:
receiving a feedback message from a follower device in the reading group, the feedback message indicating a reading state of a user of the follower device; and
providing the feedback message to the master device, wherein responsive to receipt of the feedback message the master device presents to an associated user, via a user interface, a notification indicative of the reading state of the user of the follower device.

12. The computer-readable medium of claim 7, wherein the follower device prevents the user from viewing ebook content that is not specified by the read section.

13. A device for synchronizing to a reading location of a computing device in a reading group, comprising:
a processor configured to execute modules; and
a memory storing the modules, the modules comprising:
a configuration module configured to cause the computing device, associated with a first user, to act as a follower device in a reading group that is associated with an ebook, the reading group including a master device associated with user other than the first user;
a synchronization module configured to:
responsive to receipt of a synchronization command including a read section, the read section specifying a portion of the ebook,
extract location information from the read section,
identify a portion of the ebook that corresponds to the extracted location information, and
divide the portion of the ebook into one or more subsets based in part on the display area of the follower device, each of the one or more subsets specific to the follower device; and
a user interface module configured to:
present a first subset of the one or more subsets on the display area to a user.

14. The device of claim 13, wherein the synchronization module is further configured to prevent the user from viewing ebook content that is not specified by the read section.

15. The device of claim 13, wherein a subset corresponds to the ebook content that may be displayed in single page to the user.

16. The device of claim 13, further comprising a feedback module configured to:
present to the user of the follower device a selectable option to send a feedback message, wherein selection of the selectable option causes the feedback module to:
generate a feedback message indicative of a reading state of the user; and
send the feedback message to the master device.

17. The device of claim 13, wherein the device receives the synchronization command from a master device.

18. The device of claim 13, further comprising a membership module configured to:
generate a join request based on a selection of the reading group;
responsive to generating the join request, send the join request to the master device; and
receive a join confirmation that confirms that the device has been added to the reading group and designates the device as a follower device.

* * * * *